May 17, 1938.  J. J. BLACK  2,118,004
PROP FOR SEMITRAILERS
Filed July 29, 1936  3 Sheets-Sheet 1
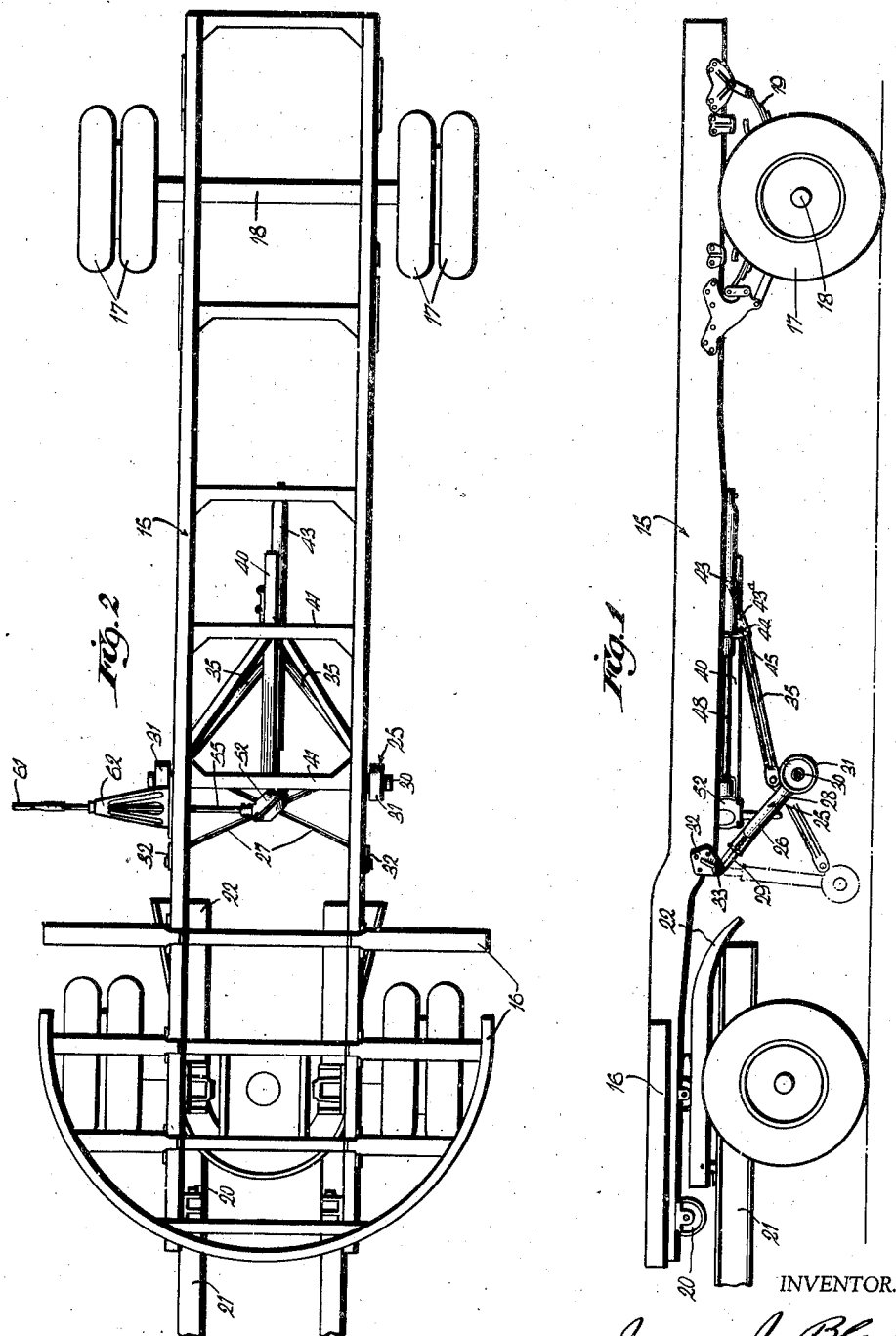
INVENTOR.
BY James J. Black
Wood & Wood
ATTORNEYS

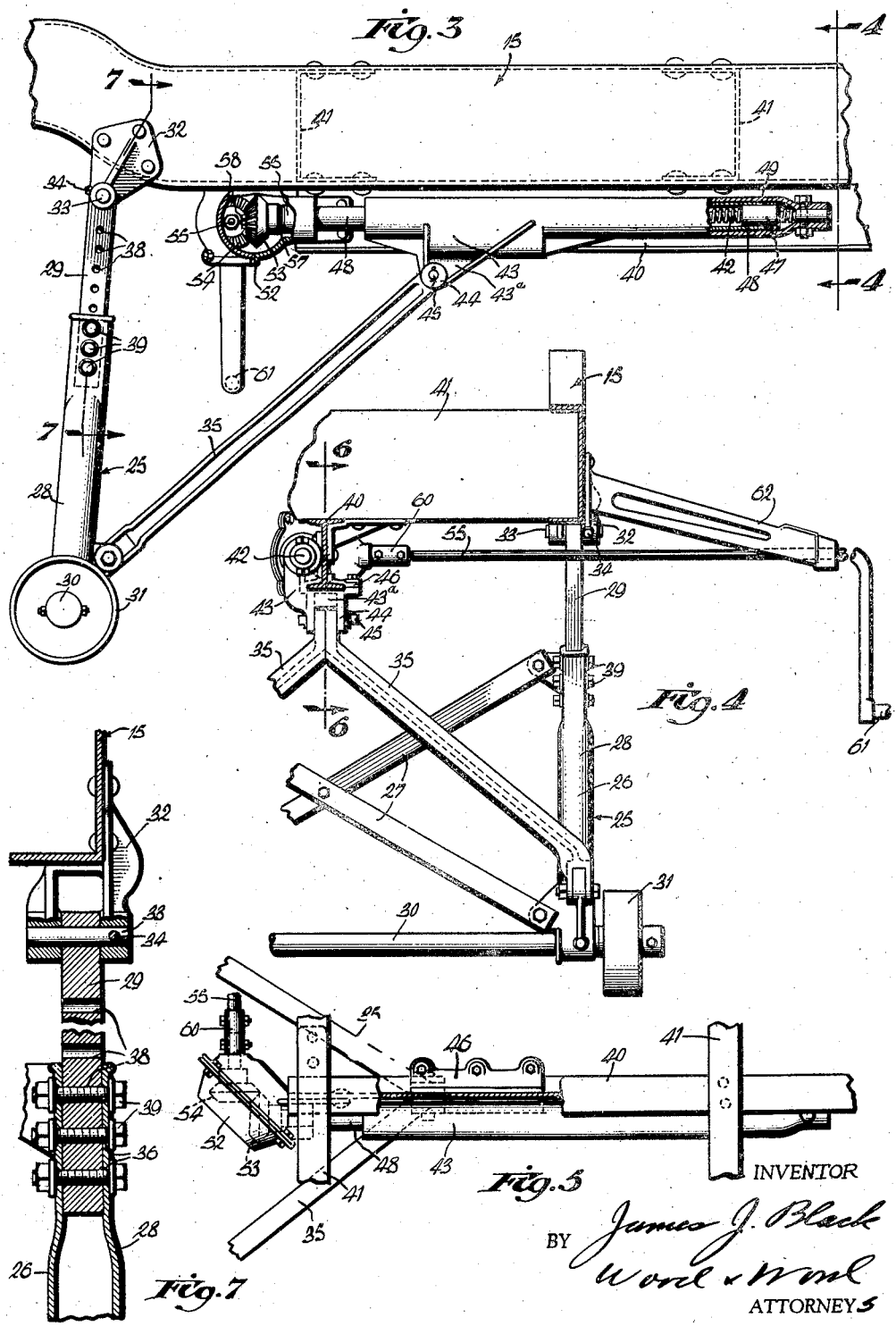

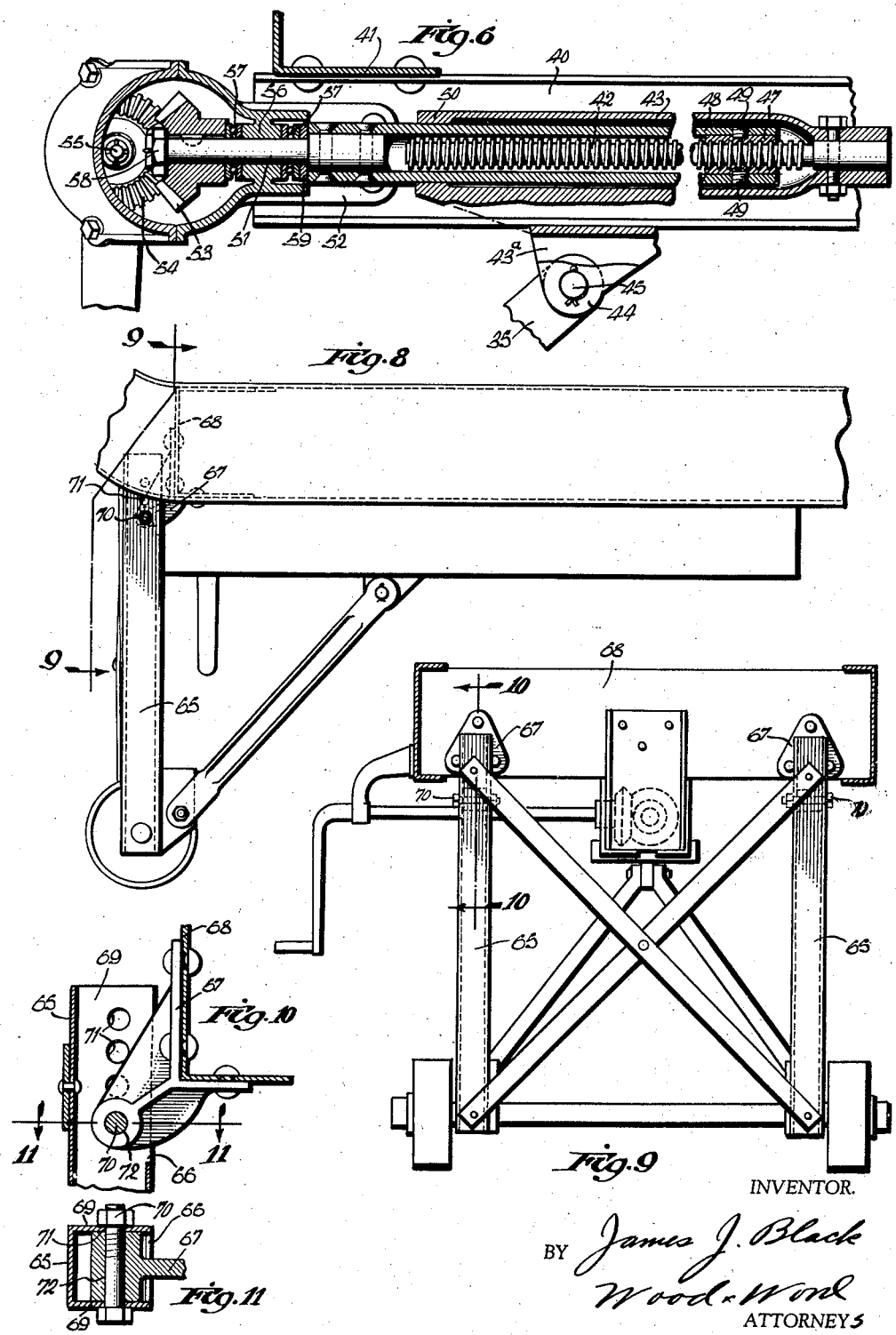

Patented May 17, 1938

2,118,004

UNITED STATES PATENT OFFICE 2,118,004

PROP FOR SEMITRAILERS

James J. Black, Cincinnati, Ohio, assignor to
The Trailer Company of America, Cincinnati,
Ohio, a corporation of Delaware Application July 29, 1936, Serial No. 93,249

5 Claims. (Cl. 254—86)

This invention relates to improvements in semi-trailers, and is particularly directed to the mechanism for supporting the coupling end of the semi-trailer when uncoupled from a drawing vehicle.

This type of trailer has its forward end adapted to be supported on the rear of a tractor for both a draft and load sustaining connection, and has its rear end provided with heavy service wheels for running gear. A prop is provided at the forward end of the trailer as a support for the same when the trailer is uncoupled from the drawing vehicle.

The drawing vehicle generally has an inclined surface or skid at its rear, terminating forwardly in a horizontal support portion at its upper end so that the action of the drawing vehicle as it backs into the forward end of the trailer is to raise the same slightly from the ground before coupling thereto. This action raises the prop from the ground, but not sufficiently to clear unevenness in the road surface. This prop is therefore pivoted to the frame so that it can be swung upwardly and clear road obstacles when the trailer and tractor are operating together.

The height of the trailer platform with respect to the ground may vary depending on the undercarriage at the rear thereof. That is to say, service wheels at the rear of different diameters may be used or the diameters of the tires employed may vary. Although the frame and the prop mechanism may remain standard, the variations in trailer height occur or are brought about by variations in wheel diameter, tire diameter, or arrangement of the axle mounting.

Therefore, it is an object of the present invention to provide a prop at the forward end of the trailer for the purposes heretofore described, which prop is adjustable for the purpose of varying its height when in service position so that the platform of the semi-trailer is horizontal or substantially so when the semi-trailer is disconnected from the tractor.

It is also necessary to efficient trailer operation that the prop elevating or retracting mechanism be arranged so that it is easily operated manually, and whereby it will lock the prop in supporting position, making it impossible for the semi-trailer to collapse at the forward end; and that the operating parts be arranged so that they will not become clogged with the usual dirt encountered in service and are fully protected and housed against the entrance of dirt so that ease of operation is always assured; that the prop construction be extremely rigid, not only the prop itself but the operating mechanism which locks it in position so that there is no chance for collapse of the semi-trailer when under heavy load.

It is therefore a further object of the invention to provide a prop mechanism which fulfills all of the aforesaid requirements.

Other objects and further advantages will be more fully apparent from a description of the accompanying drawings, in which:

Figure 1 is a side elevation of a semi-trailer, showing the rear portion of the drawing vehicle, and illustrating the improved prop mechanism drawn up clear of the ground for proper clearance as the semi-trailer is being drawn.

Figure 2 is a top plan view of Figure 1.

Figure 3 is a fragmentary enlarged view of the intermediate portion of the semi-trailer, showing the prop and its operating mechanism in detail with certain of the parts broken away for more clearly illustrating the internal mechanism.

Figure 4 is a fragmentary sectional view taken on line 4—4, Fig. 3, illustrating the details of the prop and the operating means.

Figure 5 is a fragmentary top plan view of a portion of the semi-trailer, showing the mounting of the prop operating means.

Figure 6 is a sectional view taken on line 6—6, Fig. 4, illustrating in enlarged detail the housed operating mechanism for moving the prop.

Figure 7 is a fragmentary sectional view taken on line 7—7, Fig. 3, illustrating in detail the adjustment means for varying the height of the prop.

Figure 8 is a fragmentary side elevation of an intermediate portion of a semi-trailer corresponding to Figure 3, but showing a modified form of prop and operating means.

Figure 9 is a sectional view taken on line 9—9, Fig. 8, showing the complete prop.

Figure 10 is a sectional view taken on line 10—10, Fig. 9, detailing the modified adjustment means for varying the height of the prop.

Figure 11 is a sectional view taken on line 11—11, Fig. 10, further detailing the adjustment means.

The present invention is entirely concerned with the prop and its operating mechanism. For this reason the details of the semi-trailer and the draft means are omitted. A general outline of the semi-trailer and draft means is disclosed for the purpose of illustrating the environment of the prop. The trailer chassis is generally indicated at 15 and a portion of the platform or frame at 16. Heavy service wheels 17 are suitably mounted on axle 18 and springs 19 at the rear of the trailer.

The extreme forward end of the semi-trailer chassis includes roller means 20 facilitating movement of the draft means or tractor 21 under the forward end of the semi-trailer as the supporting and coupling connection is made.

The trailer or tractor includes a skid 22 effective for raising and supporting the forward end of the trailer when the tractor is backed under the same, and the prop mechanism is supporting the forward end of the semi-trailer. Appropriate fifth wheel mechanisms are provided to permit swivelling movement of the truck relative to the trailer. Likewise, a king pin and coupling jaws are provided for the draft connection.

The present concept resides entirely in the prop unit including the prop itself and the operating means or unit for raising and lowering the prop, specifically residing in the provision of an improved means for adjusting the height of the prop in an extremely simple manner without altering the stability of the prop and in an operating mechanism which is highly stable and durable and which operates manually with extreme ease including protective housings for protecting the closely operating parts from the dirt encountered on the highway.

Referring specifically to the drawings as to the prop unit, the prop is generally indicated at 25. It consists of legs or standards 26, one at each side of the unit, and braces 27. The legs are in sections telescopically arranged and indicated at 28 and 29 respectively. The braces are crossed, each brace having its ends connected respectively to the upper end of one lower section and the lower end of the other. The lower ends of the portions or sections 28 provide suitable lugs traversed by and supporting an axle 30 which rotatively supports small wheels 31 facilitating movement of the semi-trailer when it is resting on the prop.

The prop is pivoted by attachment of the upper ends of the legs or standards 26 to pivot brackets 32 rigidly attached to the frame or chassis of the semi-trailer as detailed in Figure 7. Each bracket provides arms straddling the upper end of the respective leg and incorporates a pivot pin 33 traversing the arms and the upper end of the respective leg. The pin is fixed in position in the bracket by means of a bolt 34.

The prop is braced and operated through the medium of a pair of arms 35, 35, having their forward ends connected to the lug portions at the lower ends of the legs, and their rearward ends joined (see Figure 4) and attached to the operating mechanism or unit.

The sections 28 and 29 of the respective prop legs, as stated, are telescopically engaged, the lower being tubular with its upper end of rectangular form for receiving the rectangular upper section. The squared upper end of the lower section includes a plurality of cross apertures 36, three in this particular instance. The upper section includes a series of cross bores 38, the centers of which are uniformly spaced apart the same distance as the centers of the apertures in the lower section.

Cross bolts 39, three in number, traverse the apertures of the lower section and appropriate apertures or bores of the upper section depending on the amount of extension of the prop legs.

In the present disclosure the prop is shown as fully extended to its maximum length for the greatest possible height of the trailer forward end.

The prop operating mechanism is supported and mounted for guided sliding movement on an I-beam 40 fixed to the underside of the trailer chassis longitudinally and centrally thereof, more specifically being bolted to bolsters 41 of the trailer chassis. The prop elevating mechanism consists of a screw and nut means manually operated from the side of the trailer.

A screw 42 is fixed against rotation having its rear end held rigidly within a housing and motion transmitting element 43 supported and guided upon the lower flange of the I-beam (see Figure 4). This element apart from its housing portion includes a downwardly extended portion 43ª surrounding the lower flange of the I-beam and providing downwardly extended spaced ears 44 between which the abutted rear ends of the prop operating arms 35 are held in position by means of a pivot pin 45. For purposes of assembly, the motion transmitting element 43 is sectional including a removable part 46 engaging the side of the I-beam, one top side of the lower flange thereof and the corresponding edge of the flange, which part 46 upon removal permits disassembly of the element 43 from the other side of the I-beam.

A nut 47 is mounted on the screw 42 within the housing and is actuated and supported by means of a tube 48 also surrounding the screw and fixed to the nut through set-screws 49. This tube extends forwardly beyond the housing through a bearing portion 50 of the housing and is riveted to the rear end of a shaft 51 telescopically engaged into the tube.

A thrust element and housing 52 is secured to the forward end of the guide rail or I-beam supporting the shaft 51. This housing contains bevel gears, one of which, namely 53, is fixed to the shaft 51 by means of a key, and the other of which, namely 54, is fixed to the inner end of a manually operated crank rod 55.

The housing containing these gears includes a bearing portion 56 in which the shaft 51 is supported, and includes end thrust bearings 57, 57, one at each side thereof. The bevel gear engages one thrust bearing and is held thereagainst by means of a nut 58 on the adjacent end of the shaft 51. The end of the tube 48 and the shoulder of the shaft engages the other thrust bearing through a thrust washer 59. Thus the nut is fixed against axial movement and upon rotation must move the non-rotative screw axially for sliding the prop actuating element along the guide rail.

A coupler 60 fixed to the crank rod 55 prevents axial movement of the sleeve relative to the bevel gear casing and thrust element through engagement with the outer side of the casing. The operating end of the crank includes a handle 61 and the adjacent end of the crank rod is supported in an extended bracket 62 fixed to the side of the semi-trailer chassis. Accordingly, upon rotation of the crank arm it will be seen that motion is transmitted through the bevel gears rotating the nut and axially shifting the screw rod, thus moving the guided housing and prop shifting element along the I-beam and swinging the prop carriage forwardly or rearwardly as may be desired.

Through the use of a nut and screw, it is provided that the prop will be fixed in any position at which it is left since no motion can be transmitted to the operating mechanism through the prop. Any motion from this direction is entirely longitudinal as to the screw and nut rather than rotative, which latter is essential to prop movement. Appropriate pitch for the nut and feed screw is provided to accomplish this purpose.

In a modified form of the device, the arrangement of the parts of the prop carriage is the same with one exception. The legs 65 instead of being in two sections are in one piece and are formed of rectangular tubes. The rear walls of the upper ends of the legs are cut away as at 66 for attachment of the legs to pivot brackets 67 fixed to a cross bolster 68 of the trailer chassis. The pivot brackets extend between the side walls 69 of the legs, and the legs are fixed thereto by means of cross bolts 70 traversing apertures 71 in the side walls of the legs and bores 72 of the pivot bracket. The series of apertures 71 are provided through the side walls of the legs along the length of the upper end of the legs so as to permit the adjustment heretofore described.

Having described my invention, I claim:

1. A prop for supporting the forward end of a semi-trailer, comprising, legs joined by cross braces, pivot brackets on the semi-trailer, pivot pins traversing the legs and said brackets for pivotally attaching said prop to said semi-trailer, said legs of tubular form and having the upper portions of their rearward walls cut away for engagement upon the pivot brackets and their side walls adjacent thereto inclusive of a series of cross bores for selectively receiving the pivot pins for varying the effective length of the prop, said brackets projecting laterally into said legs.

2. Means for raising and lowering a prop having its upper end pivotally mounted on the chassis of the semi-trailer, comprising, operating arms extending rearwardly upwardly from the lower rear side of the prop, a guide rail extending longitudinally of the semi-trailer chassis rearwardly of the prop, a unit attached to the operating arms and guided on said rail for sliding movement therealong, said unit including a non-rotatable screw internally disposed therein, a rotatable nut disposed upon the screw within the unit, a manually operated shaft projecting into the unit and having the nut fixed thereto, and means for rotating said shaft for moving said unit along the rail for raising and lowering the prop.

3. Mechanism for raising and lowering a prop pivotally mounted on the underside of the chassis of the semi-trailer, comprising, a guide rail extending longitudinally of the semi-trailer chassis, a unit guided on said rail for sliding movement therealong, means for pivotally connecting said unit to the swinging end of the prop, said unit including a casing, said casing housing a screw and nut, and a manually operated shaft projecting into the unit for traversing the unit by means of the screw and nut for raising and lowering the prop.

4. Mechanism for raising and lowering a prop pivotally mounted on the chassis of the semi-trailer, comprising, a guide rail extending longitudinally of the semi-trailer chassis, a unit guided on said rail for sliding movement therealong, means for pivotally attaching said unit to the swinging end of the prop, said unit including a non-rotatable screw internally disposed therein, a rotatable nut disposed upon the screw within the unit, a manually operated shaft projecting into the unit and having a tubular end surrounding the screw and carrying the nut fixed thereto, and means for rotating said shaft along the rail for raising and lowering the prop.

5. A prop device for supporting the forward end of a semi-trailer, including a prop pivotally mounted on the underside of the chassis, a guide rail extending longitudinally of the semi-trailer chassis, a unit guided on said rail for sliding movement therealong, means for pivotally connecting said unit to the swinging end of the prop, said unit housing a screw therein, a nut disposed on the screw within the unit, a manually operated shaft projecting into the unit for rotating the nut, and moving said unit along the rail for raising and lowering the prop.

JAMES J. BLACK.